Jan. 9, 1968   R. SWAN ET AL   3,362,036
FOOTWEAR AND ADHESIVE MEANS THEREFOR
Filed Oct. 22, 1965
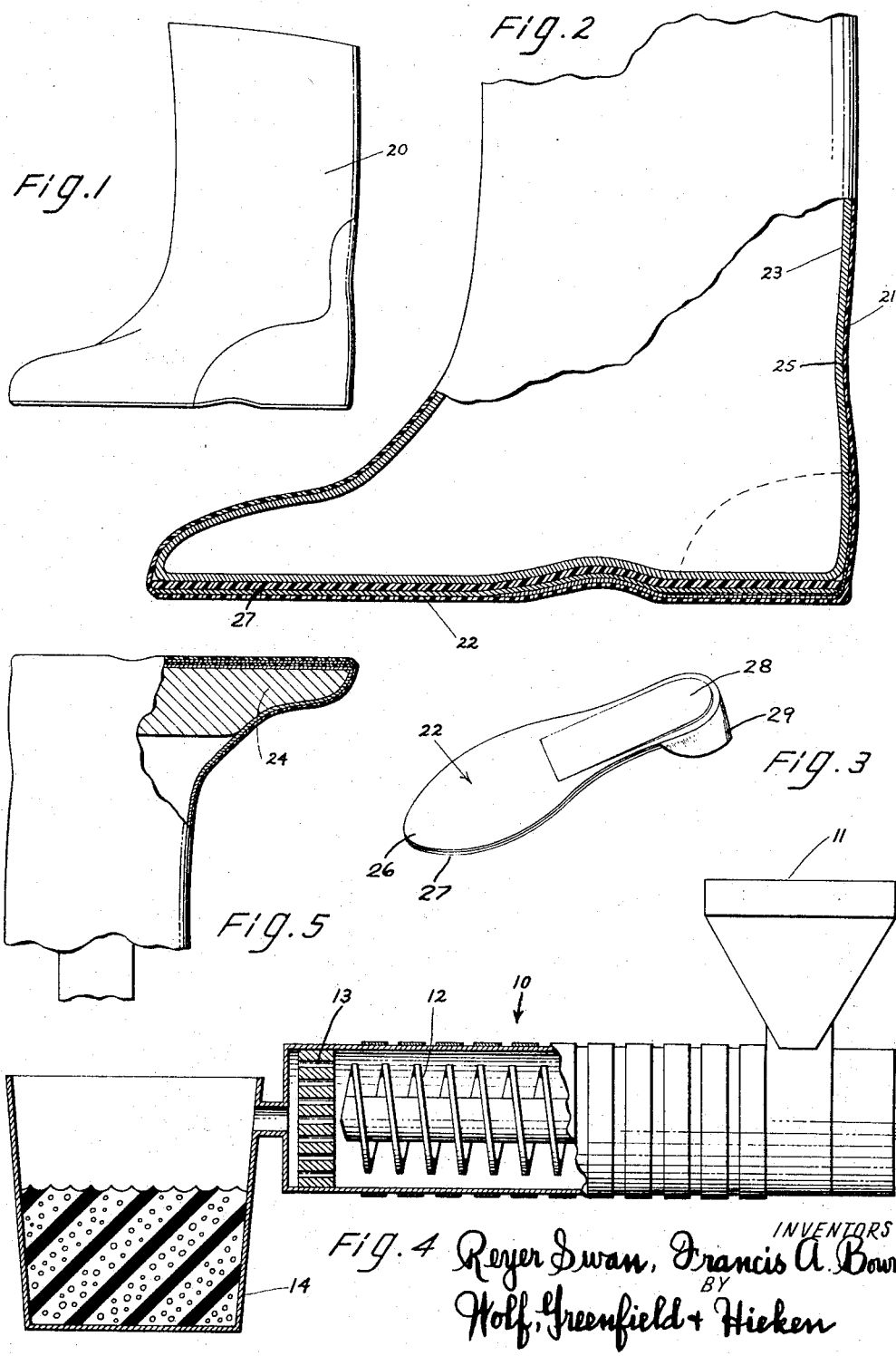
INVENTORS
Roger Swan, Francis A. Bowman
BY
Wolf, Greenfield + Hicken United States Patent Office 3,362,036
Patented Jan. 9, 1968

3,362,036
FOOTWEAR AND ADHESIVE MEANS THEREFOR
Reyer Swan and Francis A. Bowman, Nashua, N.H., assignors to Hampshire Manufacturing Corporation, Nashua, N.H.
Filed Oct. 22, 1965, Ser. No. 500,730
11 Claims. (Cl. 12—142)

ABSTRACT OF THE DISCLOSURE

A method is provided for use in the shoe industry comprising fitting a liner over a last, applying an insole to the liner with the upper and lower sides of the insole having a thin, uniform layer of a molten thermoplastic, foamed, hot melt adhesive thereover and subsequently pulling an outer shell over the liner and insole whereby applied pressure adheres the insole, liner and shell. The method includes the novel and advantageous use of a thermoplastic, foamed, hot melt adhesive in causing adhesive action whereby the viscosity of the adhesive can be predetermined at a selected value.

---

In recent years the use of hot melt adhesives in the footwear and other industries has become widespread. For example, often in the shoe industry a thermoplastic, hot melt adhesive material is spread over the inside surface of an outer sole and an insole is laminated thereto. However, it is difficult to uniformly spread conventionally used hot melt adhesives over a surface since the viscosity of the adhesives, at the normally employed application temperature, is often too high. Often excess adhesive must be employed to assure proper covering of the surface. Another problem previously encountered when using hot melt adhesives is the high friction coefficient of surfaces so coated. Thus, it is difficult to slide a first surface over a second adhesive coated surface so that the first surface is positioned in proper registration with the second surface and then adhered.

An important object of this invention is to provide improved thermoplastic, hot melt adhesive materials which are easily spreadable in uniform amounts over surfaces to be joined.

Another important object of this invention is to provide thermoplastic, hot melt adhesive materials in accordance with the preceding object which are particularly desirable for usage in the footwear industry due to inherent lubricating action during assembly of shoe parts.

Still another object of this invention is to provide a method of forming thermoplastic, hot melt adhesive materials in accordance with the preceding objects.

A still further object of this invention is to provide a method of joining surfaces with thermoplastic, hot melt adhesive materials in accordance with the preceding objects which method is particularly useful in shoe and boot manufacture.

According to the invention, foamed, thermoplastic, hot melt adhesives are provided having substantially uniformly incorporated therein a gas which is preferably air, but always substantially inert with respect to the thermoplastic adhesive at the melting point of the adhesive. The gas imparts lubricating properties to the molten adhesives and reduces viscosity to permit ease of uniform spreading over a surface to be joined by laminating. Conventional thermoplastic, hot melt adhesives are heated and mixed with air preferably in an extruder to obtain a hot melt of the foamed adhesive.

In one application of the foamed, hot melt adhesive of this invention, it is used in a method of forming a footwear article having an outer boot shell and a full inner liner with an intermediate insole. In this method the liner is fitted over a last and the foamed thermoplastic hot melt adhesive is applied to upper and lower sides of a shaped insole after which the insole is applied to the part of the liner adjacent the sole portion of the outer shell. Subsequently, the outer shell is pulled over the liner and insole with portions of the outer shell sliding over the adhesive-coated bottom surface of the insole. In a subsequent step, pressure is applied to force the outer sole of the shell into direct contact with the insole and the insole in turn against the liner and last as the adhesive hardens and cools whereby the shoe portions are adhered together into a finished product.

It is a feature of this invention that the adhesive can be foamed during the same step used to form it into a melt with only slight modification of conventional extrusion equipment. Moreover, air can be used as the foaming means and the cost of the foamed hot melt adhesive is substantially similar to the prior used unfoamed adhesive. Yet, substantial savings can be made in application due to easy spreading and low viscosity permitting uniform coverage of a surface with relatively smaller amounts of adhesive than previously used.

These and other objects, features and advantages of the invention will be better understood with reference to the following specification and accompanying drawing in which:

FIG. 1 is a side view of a boot manufactured in accordance with a preferred embodiment of this invention;
FIG. 2 is a fragmentary cross sectional view thereof;
FIGS. 3 and 5 are views of steps in the manufacture thereof; and,
FIG. 4 is a semi-diagrammatic showing partially in section of a step in the manufacture of a preferred embodiment of the adhesive of this invention.

The foamed thermoplastic hot melt adhesives of the present invention may be formed from any of the well known thermoplastic polymeric materials which have adhesive properties. Such materials include but are not limited to ethylene acetate, polystyrene, acrylic polymers, polyamides, polyesters, polyethylene, polypropylene, vinyl resins, waxes, and polyurethanes. Polyurethanes have been found to be most suitable for use in the shoe industry in joining the surfaces of vinyl, cardboard, textile fabric, paper and leather materials to each other or to themselves. Such polyurethanes are conventionally formed from the combination of isocyanates with polyols such as polyethers and polyesters to yield thermoplastic organic polymers joined through the formation of urethane linkages.

The thermoplastic hot melt adhesives of this invention have uniformly incorporated therein an amount of air, or other gas inert to the material with which they are used at the temperatures employed, in an amount sufficient to make the adhesives easily spreadable at the temperatures of application which normally lie in the range of from about 200 to about 500° F. The cellular or foamed thermoplastic hot melt adhesives have from about 50 to about 85% by volume gas and preferably from about 60 to about 80% by volume gas. The foamed adhesives have an adhesive viscosity, i.e. resistance to flow, at their temperature of use in molten form, equivalent to a heavy liquid viscosity of from about 6,000 to about 10,000 centipoise.

Preferably the adhesive is foamed just prior to use by an extrusion process. The extruder used does not have a restricted zone where air and other gasses are prevented from passing through the extruder to the extrusion orifice. Thus, as diagrammatically shown in FIG. 4 the extruder 10 having a conventional feed hopper 11 is provided with an extrusion screw 12 which creates substantially no back pressure during extrusion of material. The screw 12 can be an ordinary wood boring screw of constant diameter. Preferably the extruder used contains a plate section 13 which comprises a series of parallel elongated passageways spaced across the barrel of the extruder and parallel to the axis of the screw 12 for uniformly mixing air or other gas contained in the resin being extruded. After passage through the mixer 13, the adhesive passes out of the extrusion orifice into a suitable heated container 14 which acts as a foamed thermoplastic adhesive supply source where the foamed adhesive is maintained in molten form ready for use. The foamed adhesive can be maintained in the molten state for periods of 5 minutes and much longer without degradation.

Normally the air entering the extruder at the hopper 11 along with chips, pellets or beads of the thermoplastic polymer is sufficient to provide for foaming of the adhesive to the degree required. In some cases supplementary air or other gas inlets may be provided along the extruder barrel to increase the gas volume in the final foam. When using urethane polymers as the foamed hot melt adhesives of the present invention, such polymers can be made for example in a 24 inch long extruder, run at a speed from about 75 to 115 r.p.m. with a screw diameter of approximately ¾ inch and an extruder barrel temperature of from 365 to 500° F. Solid resin pellets are fed into the hopper and extruded in a foamed hot melt at an output of from about 6 to 9 pounds per hour into the pot 14 which is maintained at a temperature of from about 365 to 500° F. The values given will vary considerably depending upon the particular thermoplastic hot melt adhesive being foamed, size of the equipment required, and the final relative viscosity and gas amount desired.

In a specific example of forming a foamed thermoplastic hot melt adhesive, an extruder substantially as above described is charged with chips of "Estane" 5740-07, a coating grade polyurethane polymer sold by the B. F. Goodrich Chemical Company of Cleveland, Ohio having a hardness of 70-95 A (Shore A) and a specific gravity of 1.20. The extruder is operated at about 100 r.p.m. with a barrel temperature of about 385° F. to produce approximately 8 pounds per hour of foamed, thermoplastic, hot melt adhesive which is deposited in pot 14. Pot 14 is maintained at a temperature of approximately 375° F. The resultant non-self supporting, foamed, hot melt adhesive contains approximately 80% by volume air and has a viscosity at 400° F. equivalent to a heavy liquid viscosity of 8,000 centipoise measured with a Brookfield Viscometer at 70° F. with spindle No. 3 at 10 r.p.m. This adhesive can be easily spread uniformly in thin layers over a surface to be laminated. Preferably the foamed adhesive is applied in a single layer having a thickness in the range of .001 to .015 inch.

Turning now to the novel and advantageous method of footwear manufacture employing foamed hot melt adhesives in accordance with this invention, a conventional boot 20 is illustrated in FIG. 1. As is known, the boot 20 has an outer continuous shell 21 of a vinyl or other plastic material. Shells such as 21 are conventionally made using a slush molding process. For example the integral shell 21 can be formed of polyvinyl chloride resin with a typical formulation comprising 100 parts by weight polyvinyl chloride, 70 parts by weight dioctyl phthalate, 15 parts by weight calcium carbonate, and 6 parts by weight stabilizer and pigment. Within the shell 21 adjacent the outsole portion thereof is an insole 22 laminated between the outsole and a full fabric lining 23. The insole can comprise a cardboard layer 26, a sponge rubber layer 27, a stiffener 28 and a counter 29. In prior art manufacturing procedures, often the insole is adhered to the outsole previous to positioning and adhering of the lining 23 to the inside of the boot. In the present procedure such boots are manufactured by pulling the lining over a last such as 24 after which the insole 22 is coated on both sides with the foamed thermoplastic hot melt adhesive of this invention. The adhesive is easily spread due to its relatively low viscosity as compared with a conventional unaerated hot melt adhesive. The last 22 is then positioned with one surface in direct contact with the upper portion of the liner as shown in FIG. 5. After this step the shell is pulled over the last so that the outsole is in direct contact with the other side of the adhesive coated insole 22. A pressure plate (not shown) is then brought into contact with the bottom of the shell to force the layers between the last and the shell into close adjacency and permit hardening of the adhesive preferably at normal room temperature to firmly join the layers together.

Preferably the insole 22 is coated with the adhesive by dipping in the pot 14 and scraping away excess adhesive although it may be applied by any conventional coating means. After dipping in the adhesive, the insole is quickly positioned on the liner as is the outer shell so that the parts are pressed together previous to hardening of the resin employed.

In a typical operation the adhesive described in the specific example above is removed from the pot 14, applied to the insole and the insole assembled with the liner and shell in approximately 20 seconds. Pressure by the pressure plate (not shown) is applied for a period of aproximately 30 seconds at room temerature. Of course the particular times and temperatures used will vary considerably depending upon the particular hot melt foamed adhesive used and the particular materials which are being joined.

It is important that the adhesive used permit sliding of portions of the shell thereover since, as will be readily understood, the shell must be pulled over the last and certain portions of the shell inner wall as indicated at 25 will contact the adhesive before the inside of the outer sole can be properly positioned. If the adhesive is too tacky, displacement of the insole occurs ruining the finished boot. Due to the foaming of the adhesive, the shell can be easily positioned and slid over the adhesive coated surface of the insole.

While specific embodiments of the present invention have been shown and described, it should be undrstood that many variations thereof are possible. For example conventional fillers and other additives can be incorporated in the thermoplastic polymers used. The adhesives of this invention can be employed in laminating various materials in applications other than the footwear method described. In all cases, the hot melt adhesive has a gas incorporated therein to reduce its viscosity and provide for better spreading and even flow in its heated state.

Therefore this invention is to be limited only by the spirit and scope of the appended claims.

What is claimed is:

1. In a method of forming a footwear article comprising an outer shell, an insole and an inner liner the improvement comprising the steps of,
   fitting said liner over a last,
   applying said insole to said liner with upper and lower sides of said insole having a thin, uniform layer of a molten thermoplastic, foamed, hot melt adhesive thereover,
   subsequently pulling said outer shell over said liner and insole,
   and applying pressure to said shell to force said liner, insole and shell into close contact whereby they are adhered together into a finished product upon hardening of said adhesive.

2. The improvement in accordance with claim 1 wherein said molten adhesive comprises 50-85% by volume of air and is applied at a temperature in the range of from 200 to 500° F.

3. The improvement in accordance with claim 2 wherein said adhesive consists essentially of a polyurethane.

4. The improvement in accordance with claim 3 wherein said outer shell is a polyvinyl chloride material.

5. The improvement in accordance with claim 3 wherein said molten adhesive has a viscosity equivalent to a heavy liquid viscosity of from about 6,000 to 10,000 centipoise.

6. A method of joining a first surface to a second surface comprising
positioning a layer of a thermoplastic, foamed, hot melt adhesive on said first surface,
said adhesive being in molten form and having substantially uniformly incorporated therein from about 50 to 85% by volume of a gas substantially inert with respect to said thermoplastic adhesive at the melting point of said adhesive, whereby said adhesive is easily spreadable in a uniform manner over said surface,
and bringing said first and second surfaces together to cause adhesion therebetween upon cooling of said adhesive.

7. A method in accordance with the method of claim 6 wherein said molten adhesive has a viscosity equivalent to a heavy liquid viscosity of from about 6,000 to 10,000 centipoise.

8. A method in accordance with the method of claim 6 wherein said molten adhesive is a polyurethane and is applied to said first surface at a temperature in the range of from 365° F. to 500° F.

9. A non-self supporting, molten, foamed, thermoplastic hot melt adhesive having substantially uniformly incorporated therein from about 50 to 85% by volume of a gas,
said gas being incorporated in said adhesive after formation of said adhesive and acting as a viscosity control agent being substantially inert with respect to said thermoplastic adhesive at the melting point of said thermoplastic adhesive, and said adhesive being maintained in an open receptacle ready for use at a temperature in the range from at least 365° F. to 500° F. for a period of at least five minutes.

10. A hot melt adhesive in accordance with claim 9 wherein said gas is air in an amount of from 60 to 80% by volume.

11. A hot melt adhesive in accordance with claim 10 consisting essentially of a polyurethane.

References Cited

UNITED STATES PATENTS

| | | | |
|---|---|---|---|
| 2,362,378 | 11/1944 | Holbrook et al. | 36—30 X |
| 2,929,800 | 3/1960 | Hill | 260—77.5 |
| 3,051,601 | 8/1962 | Schick | 161—190 X |
| 3,063,958 | 11/1962 | Perkins et al. | 12—142 |
| 3,072,582 | 1/1963 | Frost. | |
| 3,079,641 | 3/1963 | Knox. | |
| 3,108,148 | 10/1963 | Coyner | 264—50 X |
| 3,212,115 | 10/1965 | Crowell | 12—145 |
| 3,251,911 | 5/1966 | Hansen | 264—50 X |

JORDAN FRANKLIN, *Primary Examiner.*

H. H. HUNTER, *Examiner.*